United States Patent
Zou (10) Patent No.: US 9,948,393 B2
(45) Date of Patent: Apr. 17, 2018

(54) VISIBLE LIGHT COMMUNICATION SYSTEM AND METHOD AND RELATED DEVICE

(71) Applicant: Robooot Network Technology Co., LTD, Hangzhou (CN)

(72) Inventor: Xiao Zou, Hangzhou (CN)

(73) Assignee: Robooot Network Technology Co., LTD., Hangzhou (CN)

( * ) Notice: Subject to any disclaimer, the term of this patent is extended or adjusted under 35 U.S.C. 154(b) by 0 days.

(21) Appl. No.: 15/169,870

(22) Filed: Jun. 1, 2016

(65) Prior Publication Data
US 2016/0373189 A1   Dec. 22, 2016

(30) Foreign Application Priority Data
Jun. 19, 2015   (CN) .......................... 2015 1 0350241

(51) Int. Cl.
*H04B 10/116* (2013.01)
(52) U.S. Cl.
CPC .................. *H04B 10/116* (2013.01)
(58) Field of Classification Search
CPC combination set(s) only.
See application file for complete search history.

(56) References Cited

U.S. PATENT DOCUMENTS

| | | | | |
|---|---|---|---|---|
| 2002/0140648 | A1* | 10/2002 | Watanabe | G09G 3/3677 345/87 |
| 2006/0239689 | A1* | 10/2006 | Ashdown | H04B 10/1141 398/130 |
| 2015/0146871 | A1* | 5/2015 | Liu | H04L 9/0852 380/256 |

\* cited by examiner

*Primary Examiner* — David Payne
*Assistant Examiner* — Omar S Ismail
(74) *Attorney, Agent, or Firm* — Arent Fox LLP; Michael Fainberg (57) ABSTRACT

The invention discloses a visible light communication system and method, and related devices, and in this solution, a visible light signal emitted by a light emitting device can be converted into a first voltage amplitude signal, a first filter process can be performed on the first voltage amplitude signal to obtain a second voltage amplitude signal in which the amplitude of the voltage signal around the frequency range of the visible light signal is suppressed, and the visible light signal can be converted into a level signal according to the voltage difference between the second voltage amplitude signal and the first voltage amplitude signal, to thereby address the problems of a required highly satisfactory light environment, low robustness to interference, a high bit error rate, etc., in visible light communication based upon constant reference voltage.

16 Claims, 7 Drawing Sheets

VISIBLE LIGHT COMMUNICATION SYSTEM AND METHOD AND RELATED DEVICE

CROSS-REFERENCE TO RELATED APPLICATIONS

This application claims the benefit of Chinese Patent Application No. 201510350241.3, filed with the State Intellectual Property Office of People's Republic of China on Jun. 19, 2015, and entitled "Visible light communication system and method, and related device", the content of which is hereby incorporated by reference in its entirety.

TECHNICAL FIELD

The present invention relates to the field of communications and particularly to a visible light communication system and method, and related device.

BACKGROUND

Visible light communication is a new short-distance wireless high-speed communication technology developed from Light Emitting Diode (LED) and other technologies, and operates under such a principle that a high-speed binary signal is emitted by a light source flickering at a high frequency because the LED or the like can be lighten or blacked out rapidly, and the binary signal is received and converted by a corresponding device into an electric signal from which information is obtained.

Particularly the visible light communication is advantageous in that it has better directivity than radio communication because electromagnetic radiation is not generated in a large space; and also since it is difficult for the signal transmitted by the transmitter to be captured in another direction than the receiver, the visible light communication also has good confidentiality. Moreover since the transmitting device (e.g., an LED light emitting device, etc.) and the receiving device (e.g., an photosensitive device, etc.) required for the visible light communication are less expensive than devices used in the radio communication, the visible light communication can be widely popularized and applied.

However in the existing visible light communication system typically the output voltage of the photoelectric conversion device is compared by a differential amplification circuit with constant voltage to output a level signal, so that an inversion condition of the output level may be significantly affected by ambient light. For example, if the ambient light is bright so that the voltage signal output as a result of conversion by the photoelectric conversion device when the visible light emitting device is either lightened or blacked out is above the other given constant reference voltage, or if the ambient light is dark so that the voltage signal output as a result of conversion when the visible light emitting device is either lightened or blacked out is below the other given constant reference voltage, then the output level of the differential amplification circuit can not be inverted when the visible light emitting device is either lightened or blacked out, so the visible light signal fails to be received and converted, so that the visible light communication system requires the light environment as a whole to be highly satisfactory, and if the light source in the environment is not satisfactory, then the communication system will have a high bit error rate, a poor quality of communication and even can not operate.

SUMMARY

Embodiments of the invention provide a visible light communication system and method, and related device so as to address the problems in the prior art of a required highly satisfactory light environment, low robustness to interference, a high bit error rate, etc., in visible light communication based upon constant reference voltage.

Particularly an embodiment of the invention provides a visible light communication system including a light emitting device, a signal transmitter, and a signal receiver, wherein: the signal transmitter is configured to convert source signal data into a binary code stream, and to control the light emitting device to be lightened or blacked out according to the binary code stream to create a visible light signal; and the signal receiver is configured to convert the visible light signal into a first voltage amplitude signal, to perform a first filter process on the first voltage amplitude signal to obtain a second voltage amplitude signal in which the amplitude of the voltage signal around the frequency range of the visible light signal is suppressed, and to convert the visible light signal into a level signal according to the voltage difference between the second voltage amplitude signal and the first voltage amplitude signal.

Furthermore an embodiment of the invention further provides a visible light communication method including: receiving a visible light signal emitted by a light emitting device, and converting the visible light signal into a first voltage amplitude signal; and performing a first filter process on the first voltage amplitude signal to obtain a second voltage amplitude signal in which the amplitude of the voltage signal around the frequency range of the visible light signal is suppressed, and converting the visible light signal into a level signal according to the voltage difference between the second voltage amplitude signal and the first voltage amplitude signal.

Correspondingly an embodiment of the invention further provides a device for receiving a signal, the device including: a signal converting unit configured to receive a visible light signal emitted by a light emitting device, and to convert the visible light signal into a first voltage amplitude signal; and a signal processing unit configured to perform a first filter process on the first voltage amplitude signal to obtain a second voltage amplitude signal in which the amplitude of the voltage signal around the frequency range of the visible light signal is suppressed, and to convert the visible light signal into a level signal according to the voltage difference between the second voltage amplitude signal and the first voltage amplitude signal.

Advantageous effects of the invention are as follows:

The embodiments of the invention provide a visible light communication system and method, and related device, and in the technical solutions according to the embodiments of the invention, the visible light signal emitted by the light emitting device can be converted into the first voltage amplitude signal, the first filter process can be performed on the first voltage amplitude signal to obtain the second voltage amplitude signal in which the amplitude of the voltage signal around the frequency range of the visible light signal is suppressed, and the visible light signal can be converted into the level signal according to the voltage difference between the second voltage amplitude signal and the first voltage amplitude signal. Stated otherwise, the filtered voltage amplitude signal in which the amplitude of the voltage signal around the frequency range of the visible light signal is suppressed can be taken as a reference voltage so that the reference voltage can vary with varying ambient light, that is, if the ambient light is bright, then the output voltage amplitude of the reference voltage will rise, and if the ambient light is dark, then the output voltage amplitude of the reference voltage will drop, so the visible light communication system according to the invention can operate normally under both the ambient light in a large range, and the flickering ambient light below the frequency of the visible light signal, etc., to thereby address the problems of a required highly satisfactory light environment, low robustness to interference, a high bit error rate, etc., in visible light communication based upon constant reference voltage so as to significantly improve the adaptability of the visible light communication system to the brightness of the operating environment, and the robustness thereof to interference including noise of flickering light, and to lower the bit error rate of visible light communication, thus improving the quality of communication in visible light communication.

BRIEF DESCRIPTION OF THE DRAWINGS

In order to make the technical solutions according to the embodiments of the invention more apparent, the drawings to which reference is made in the description of the embodiments will be described below briefly, and apparently the drawings described below are merely illustrative of some of the embodiments of the invention, and those ordinarily skilled in the art can further obtain other drawings from these drawings without any inventive effort. In the drawings.

DETAILED DESCRIPTION OF THE EMBODIMENTS

In order to make the objects, technical solutions, and advantages of the invention more apparent, the invention will be described below in further details with reference to other drawings, and apparently the embodiments as described are merely a part but not all of the embodiments of the invention. All the other embodiments which can occur to those ordinarily skilled in the art from the embodiments here of the invention without any inventive effort shall fall into the scope of the invention as claimed.

First Embodiment

Figure 1:
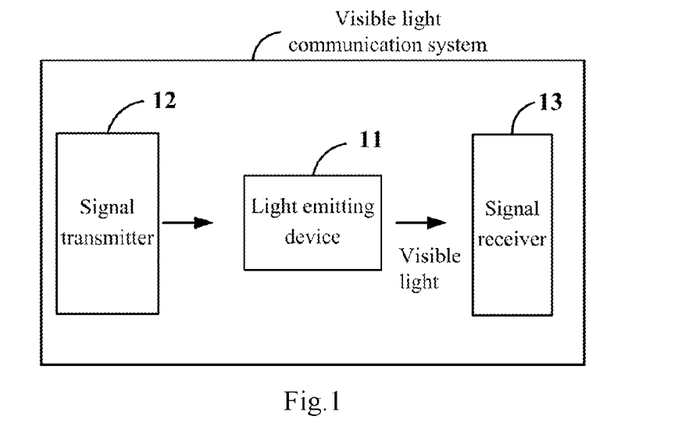
FIG. 1 illustrates a possible schematic structural diagram of a visible light communication system according to the invention.

The first embodiment of the invention provides a visible light communication system, and as illustrated in FIG. 1 which is a possible schematic structural diagram of the visible light communication system according to the invention, where the visible light communication system can include a light emitting device 11, a signal transmitter 12, and a signal receiver 13, where:

The signal transmitter 12 can be configured to convert source signal data into a binary code stream, and to control the light emitting device 11 to be lightened or blacked out according to the binary code stream to create a visible light signal; and The signal receiver 13 can be configured to convert the visible light signal emitted by the light emitting device 11 into a first voltage amplitude signal, to perform a first filter process on the first voltage amplitude signal to obtain a second voltage amplitude signal in which the amplitude of the voltage signal around the frequency range of the visible light signal is suppressed, and to convert the visible light signal into a level signal according to the voltage difference between the second voltage amplitude signal and the first voltage amplitude signal.

As can be apparent from the disclosure above, in the embodiment of the invention, the corresponding communication may not be conducted based upon constant reference voltage, but the visible light signal can be converted into the level signal according to the voltage difference between the second voltage amplitude signal obtained as a result of the corresponding filter process, and the original voltage amplitude signal. That is, the second voltage amplitude signal, obtained as a result of the filter process, where the amplitude of the voltage signal around the frequency range of the visible light signal is suppressed, is taken as the reference voltage so that the reference voltage can vary with varying ambient light, that is, if the ambient light is bright, then the output voltage amplitude of the reference voltage will rise, and if the ambient light is dark, then the output voltage amplitude of the reference voltage will drop, so the visible light communication system according to the invention can operate normally under both the ambient light in a large range, and the flickering ambient light below the frequency of the visible light signal, etc., to thereby address the problems of a required highly satisfactory light environment, low robustness to interference, a high bit error rate, etc., in visible light communication based upon constant reference voltage so as to significantly improve the adaptability of the visible light communication system to the brightness of the operating environment, and the robustness thereof to interference including noise of flickering light, and to lower the bit error rate of visible light communication, thus improving the quality of communication in visible light communication.

Optionally the light emitting device 11 can typically be an LED light emitting device including at least one LED, e.g., an LED point light source including at least one LED, or an LED linear light source including at least one LED, etc. Of course, it shall be noted that the light emitting device 110 will not be limited to an LED light emitting device including at least one LED, but can be an incandescent lamp, a fluorescent lamp, or another normal light emitting device, and the embodiment of the invention will not be limited thereto.

Optionally the signal transmitter 12 can include a serialization module, and a light emitting device driver module, where:

The serialization module can be configured to convert the source signal data into the binary code stream, and to transmit the binary code stream to the light emitting device driver module; and The light emitting device driver module can be configured to receive the binary code stream transmitted by the serialization module, and to control the light emitting device 11 to be lightened or blacked out, according to the binary code stream to create the visible light signal.

Optionally the light emitting device driver module can be configured to control the lighten the light emitting device 11 according to the value of each bit of data in the binary code stream by lightening the light emitting device 11 if the data are 0, and blacking out the lighten the light emitting device 11 if the data are 1; or by lightening the light emitting device 11 if the data are 1, and blacking out the lighten the light emitting device 11 if the data are 0.

Furthermore in order to improve the quality of communication of the visible light communication system, the light emitting device 11 is typically set facing the signal receiver 13; and moreover the center of the light emitting device 11 can be located on the same horizontal plane as the center of the signal receiver 13; and of course, it shall be noted that the center of the light emitting device 11 may not be located on the same horizontal plane as the center of the signal receiver 13 as long as the visible light signal emitted by the light emitting device 11 can illuminate the corresponding signal receiver 13. Moreover the light emitting device 11 can be set in the same terminal as the signal transmitter 12 instead of being set separately from the signal transmitter 12, to thereby compose the corresponding terminal capable of transmitting the visible light signal, although a repeated description thereof will be omitted here in the embodiment of the invention.

Furthermore in the embodiment of the invention, the signal receiver 13 can be particularly configured to convert the visible light signal into the first voltage amplitude signal through one or two branches of photoelectric conversion devices, where the photoelectric conversion devices can include at least photosensitive diodes, photistor, or photosensitive resistors, etc., although the embodiment of the invention will not be limited thereto.

It shall be noted that if there are two branches of photoelectric conversion devices in the signal receiver 13, then the distance between the two branches of photoelectric conversion devices will be not more than a preset distance threshold, that is, the distance between the two branches of photoelectric conversion devices will be as short as possible so that the visible light signal emitted by the light emitting device 11 illuminates the two branches of photoelectric conversion devices at substantially the same brightness, where the preset distance threshold depends upon an application scenario and an application object, and if the distance threshold is smaller, then interference to the system will be lower.

Furthermore in order to improve the quality of communication of the visible light communication system, if there is one branch of photoelectric conversion device in the signal receiver 13, then the signal receiver 13 can be further configured to amplify power of the first voltage amplitude signal through one or two branches of power amplification circuits before performing the first filter process on the first voltage amplitude signal.

For example, optionally if there are mutual influences between the second voltage amplitude signal obtained as a result of the corresponding filter process, and the original voltage amplitude signal (i.e., the first voltage amplitude signal), or the first voltage amplitude signal output by the photoelectric conversion device significantly varies due to the second voltage amplitude signal, then firstly the power of the first voltage amplitude signal output by the photoelectric conversion device will be amplified by the one or two branches of power amplification circuits.

It shall be noted that the power of the first voltage amplitude signal output by the photoelectric conversion device can be amplified by amplifying one branch of the first voltage amplitude signal on which the first filter process is to be performed, and of course, the other branch of the first voltage amplitude signal on which the first filter process is not to be performed can also be amplified, although a repeated description thereof will be omitted here.

Furthermore in the embodiment of the invention, the signal receiver 13 can be particularly configured to perform the first filter process on the first voltage amplitude signal through a first filter circuit configured to suppress the amplitude of the voltage signal around the frequency range of the visible light signal, to obtain the second voltage amplitude signal in which the amplitude of the voltage signal around the frequency range of the visible light signal is suppressed, and to convert the visible light signal into the level signal through the differential amplification circuit according to the voltage difference between the second voltage amplitude signal and the first voltage amplitude signal.

Here the first filter circuit can include at least a low-pass filter circuit with a cutoff frequency below the frequency of the visible light signal, a band-stop filter circuit capable of attenuating frequency components around the frequency range of the visible light signal to a preset threshold, etc. The differential amplification circuit can include at least an operational amplifier, a comparator, etc., although the embodiment of the invention will not be limited thereto.

Moreover it shall be noted that the first filter circuit can be any form of filter circuit including but not limited to various typical RC and LC filter circuits, digital filter circuits, etc., as long as when the light emitting device 11 is lightened and blacked out, the state of the level signal at the signal output terminal 13 can vary due to the voltage difference between the second voltage amplitude signal obtained as a result of the first filter process, and the first voltage amplitude signal.

Stated otherwise, in the embodiment of the invention, the signal receiver 13 can be a circuit receiving the light signal, which is composed of the photoelectric conversion device, the filter circuit, the differential amplification circuit, and other primary elementary devices to convert the light signal into the corresponding output level signal.

For example, the signal receiver 13 can be particularly configured to convert the visible light signal from the light emitting device 11 into the first voltage amplitude signal using the photoelectric conversion device, to perform the filter process on the first voltage amplitude signal using the low-pass filter circuit with the cutoff frequency below the frequency of the visible light signal to obtain the second voltage amplitude signal, and to connect both the second voltage amplitude signal as the reference voltage, and the original first voltage amplitude signal to two terminals of the differential amplification circuit, so that when the light emitting device 11 is lightened, the voltage amplitude of the original voltage amplitude signal (i.e., the first voltage amplitude signal) which is not subjected to the corresponding filter process will be above the voltage amplitude of the other branch of voltage amplitude signal (i.e., the second voltage amplitude signal) subjected to the filter process; and when the light emitting device is blacked out, the voltage amplitude of the original voltage amplitude signal which is not subjected to the corresponding filter process will drop rapidly below the voltage amplitude of the other branch of voltage amplitude signal subjected to the filter process, so that the output level of the differential amplification circuit can be inverted for the effect of outputting stably at the different level according to the voltage difference between the second voltage amplitude signal and the first voltage amplitude signal to thereby convert the visible light signal into the level signal.

It shall be noted that the signal receiver 13 (or the differential amplification circuit) can output a high level when the light emitting device 11 is lightened, and a low level when the light emitting device 11 is blacked out, or can output a high level when the light emitting device 11 is blacked out, and a low level when the light emitting device 11 is lightened, although the embodiment of the invention will not be limited thereto.

Furthermore in order to filter out effectively noise at high frequencies above the frequency of the visible light signal and/or noise at low frequencies below the frequency of the visible light signal to thereby improve the quality of communication in the visible light communication system, before converting the visible light signal into the level signal according to the voltage difference between the second voltage amplitude signal and the first voltage amplitude signal, the signal receiver 13 can be further configured to perform a second filter process on the first voltage amplitude signal to obtain a third voltage amplitude signal in which the amplitude of the voltage signal above and/or below the frequency of the visible light signal is suppressed, to convert the visible light signal into the level signal according to the voltage difference between the second voltage amplitude signal and the third voltage amplitude signal obtained as a result of the second filter process.

Optionally the signal receiver 13 can be particularly configured to perform the second filter process on the first voltage amplitude signal through a second filter circuit configured to suppress the amplitude of the voltage signal above and/or below the frequency of the visible light signal, to obtain the third voltage amplitude signal in which the amplitude of the voltage signal above and/or below the frequency of the visible light signal is suppressed Here taking as an example the second filter circuit which is a second filter circuit configured to suppress the amplitude of the voltage signal above the frequency of the visible light signal, the second filter circuit can include at least:

a low-pass filter circuit with a cutoff frequency above the frequency of the visible light signal, or a band-pass filter circuit capable of attenuating frequency components above the frequency of the visible light signal to a preset threshold, etc.

Moreover it shall be noted that the second filter circuit can be any form of filter circuit including but not limited to various typical RC and LC filter circuits, digital filter circuits, etc., as long as the accurate level signal can be generated by comparing the first voltage amplitude signal subjected to the second filter process, with the second voltage amplitude signal.

A possible structure of the light signal reception circuit which can be set on the surface of the signal receiver 13 will be described below in brief taking as an example two branches of photoelectric conversion devices converting the visible light signal into the first voltage amplitude signal.

Figure 2A:
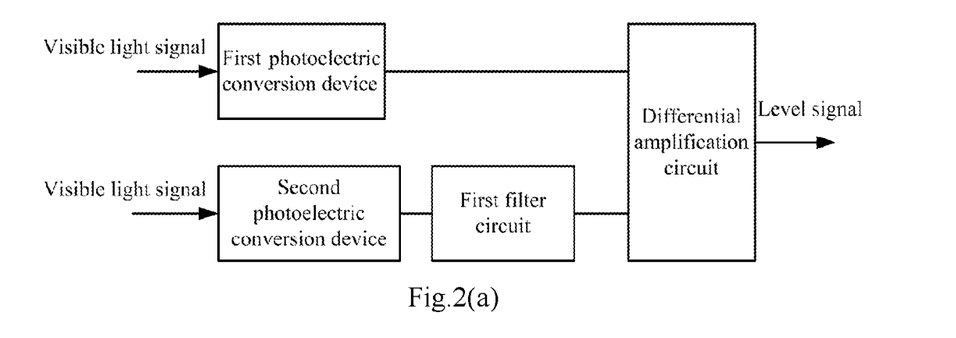
FIG. 2(a) illustrates a possible schematic structural diagram of a light signal reception circuit including two branches of photoelectric conversion devices according to the invention.

FIG. 2(a) illustrates a possible schematic structural diagram of the light signal reception circuit including two branches of photoelectric conversion devices, where the light signal reception circuit includes first and second photoelectric conversion devices, the first filter circuit (unless stated otherwise, the first filter circuit refers to a first filter circuit configured suppress the amplitude of the voltage signal around the frequency range of the visible light signal, e.g., a low-pass filter circuit with a cutoff frequency below the frequency range of the visible light signal, etc.), and the differential amplification circuit, where an output terminal of the first photoelectric conversion device is connected with one of the input terminals of the differential amplification circuit, an output terminal of the second photoelectric conversion device is connected with the input terminal of the first filter circuit, and the output terminal of the first filter circuit is connected with the other input terminal of the differential amplification circuit.

Stated otherwise, at this time, the first voltage amplitude signal output by one branch of photoelectric conversion device is input directly to one of the input terminals of the differential amplification circuit, and the first voltage amplitude signal output by the other branch of photoelectric conversion device is processed by the first filter circuit and then input to the other input terminal of the differential amplification circuit.

Figure 2B:
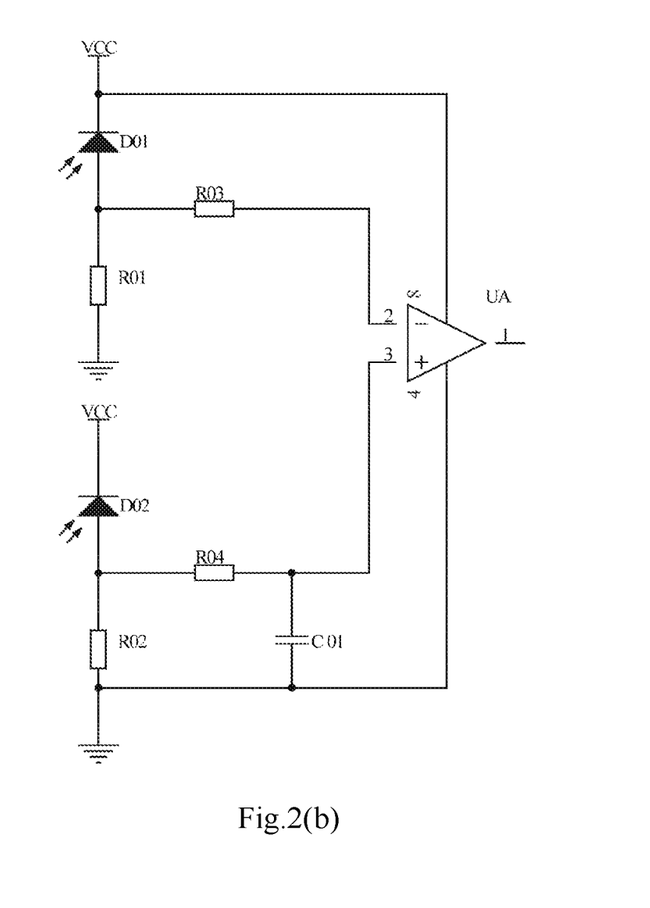
FIG. 2(b) illustrates a possible schematic connection diagram of the light signal reception circuit including the two branches of photoelectric conversion devices according to the invention.

Furthermore taking as an example the first and second photoelectric conversion devices being photosensitive diodes, the first filter circuit being an RC filter circuit, and the differential amplification circuit being a comparator, FIG. 2(b) illustrates a possible circuit connection diagram of the light signal reception circuit illustrated in FIG. 2(a), where:

A cathode of a photoelectric conversion device D01 is connected with a power source VCC, and an anode thereof is connected with the ground through a resistor R01, and moreover voltage across the resistor R01 is connected to a negative terminal of a differential amplification circuit UA through a resistor R03; and a cathode of a photoelectric conversion device D02 is connected with the power source VCC, and an anode thereof is connected with the ground through a resistor R02, and moreover a filter voltage value is output by an RC low-pass filter circuit consisted of a resistor R04 and a capacitor C01 to a positive terminal of the differential amplification circuit UA. If the visible light signal is input to the photoelectric conversion devices D01 and D02 at a frequency above a cutoff frequency of the low-pass filter circuit consisted of R04 and C01, then when the light emitting device is lightened, the voltage at the negative input terminal of UA will be above the voltage at the positive input terminal of UE; and when the light emitting device is blacked out, the voltage at the negative input terminal of UA will be below the voltage at the positive input terminal of UE, so that the level at the output terminal of UE will be inverted accurately to thereby convert the visible light signal into the level signal.

Preferably in order to better guarantee stable inversion of the level, if performance parameters of the photoelectric conversion devices D01 and D02 are the same, then the value of the resistor R02 can be slightly more than the value of the resistor R01.

Figure 3A:
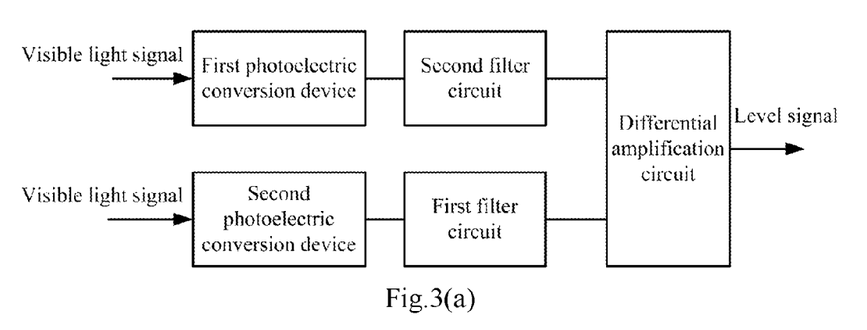
FIG. 3(a) illustrates another possible schematic structural diagram of a light signal reception circuit including two branches of photoelectric conversion devices according to the invention.

Furthermore FIG. 3(a) illustrates another possible schematic structural diagram of the light signal reception circuit including two branches of photoelectric conversion devices, where the light signal reception circuit includes first and second photoelectric conversion devices, the first and second filter circuits (unless stated otherwise, the second filter circuit refers to a second filter circuit configured to suppress the amplitude of the voltage signal above and/or below the frequency of the visible light signal, e.g., a low-pass filter circuit with a cutoff frequency above the frequency of the visible light signal), and the differential amplification circuit, where an output terminal of the first photoelectric conversion device is connected with the input terminal of the second filter circuit, an output terminal of the second filter circuit is connected with one of the input terminals of the differential amplification circuit, an output terminal of the second photoelectric conversion device is connected with the input terminal of the first filter circuit, and the output terminal of the first filter circuit is connected with the other input terminal of the differential amplification circuit.

Stated otherwise, at this time, the first voltage amplitude signal output by one branch of photoelectric conversion device is processed by the second filter circuit and then input to one of the input terminals of the differential amplification circuit, and the first voltage amplitude signal output by the other branch of photoelectric conversion device is processed by the first filter circuit and then input to the other input terminal of the differential amplification circuit.

Figure 3B:
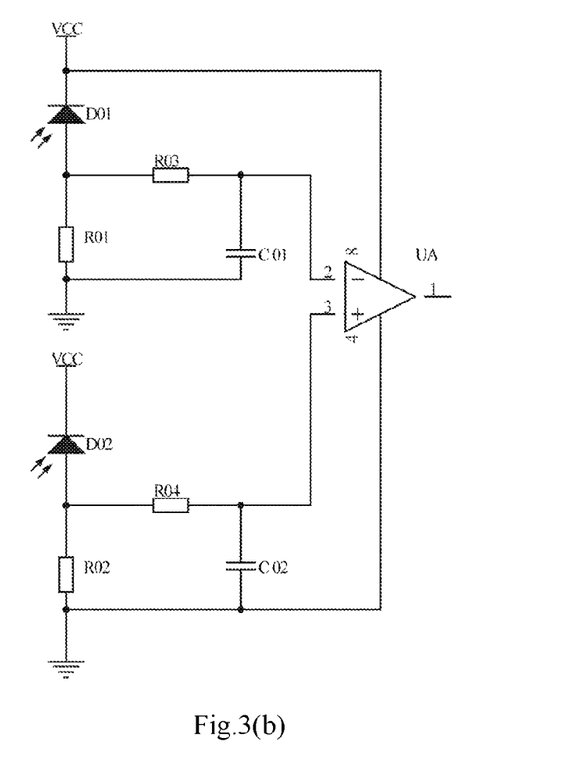
FIG. 3(b) illustrates another possible schematic connection diagram of the light signal reception circuit including two branches of photoelectric conversion devices according to the invention.

Furthermore taking as an example the first and second photoelectric conversion devices being photosensitive diodes, the first and second filter circuits being RC filter circuits, and the differential amplification circuit being a comparator, FIG. 3(b) illustrates a possible circuit connection diagram of the light signal reception circuit illustrated in FIG. 3(a), where:

A cathode of a photoelectric conversion device D01 is connected with a power source VCC, and an anode thereof is connected with the ground through a resistor R01, and moreover filtered voltage across the resistor R01 is connected to a negative terminal of a differential amplification circuit UA through an RC low-pass filter circuit consisted of a resistor R03 and a capacitor C01; and a cathode of a photoelectric conversion device D02 is connected with the power source VCC, and an anode thereof is connected with the ground through a resistor R02, and moreover a filter voltage value is output by an RC low-pass filter circuit consisted of a resistor R04 and a capacitor C02 to a positive terminal of the differential amplification circuit UA. If the visible light signal is input to the photoelectric conversion devices D01 and D02 at an operating frequency above a cutoff frequency of the low-pass filter circuit consisted of R04 and C02, and below a cutoff frequency of the low-pass filter circuit consisted of R03 and C01, then when the light emitting device is lightened, the voltage at the negative input terminal of UA will be above the voltage at the positive input terminal of UE; and when the light emitting device is blacked out, the voltage at the negative input terminal of UA will be below the voltage at the positive input terminal of UE, so that the level at the output terminal of UE will be inverted accurately to thereby convert the visible light signal into the level signal.

Preferably in order to better guarantee stable inversion of the level, if performance parameters of the photoelectric conversion devices D01 and D02 are the same, then the value of the resistor R02 can be slightly more than the value of the resistor R01.

Furthermore a possible structure of the light signal reception circuit which can be set on the surface of the signal receiver 13 will be described below in brief taking as an example one branch of photoelectric conversion device converting the visible light signal into the first voltage amplitude signal.

Figure 4A:
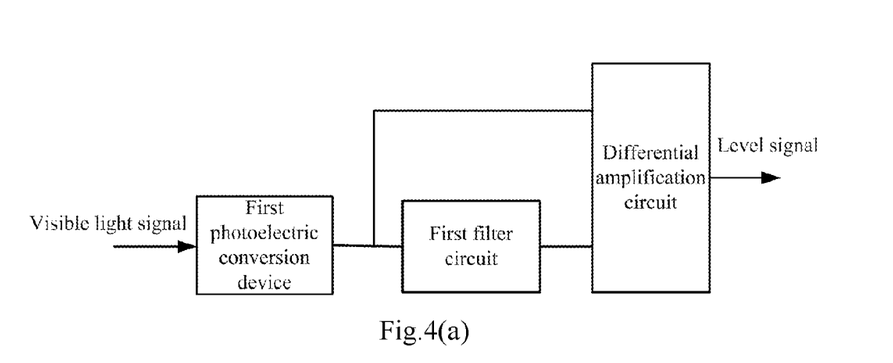
FIG. 4(a) illustrates a possible schematic structural diagram of a light signal reception circuit including one branch of photoelectric conversion device according to the invention.

FIG. 4(a) illustrates a possible schematic structural diagram of the light signal reception circuit including one branch of photoelectric conversion device, where the light signal reception circuit includes a first photoelectric conversion device, the first filter circuit, and the differential amplification circuit, where an output terminal of the first photoelectric conversion device is connected with one of the input terminals of the differential amplification circuit, and also possibly with the input terminal of the first filter circuit, and the output terminal of the first filter circuit is connected with the other input terminal of the differential amplification circuit.

Stated otherwise, at this time, one branch of the first voltage amplitude signal output by the photoelectric conversion device is input directly to one of the input terminals of the differential amplification circuit, and the other branch of the first voltage amplitude signal is processed by the first filter circuit and then input to the other input terminal of the differential amplification circuit.

Figure 4B:
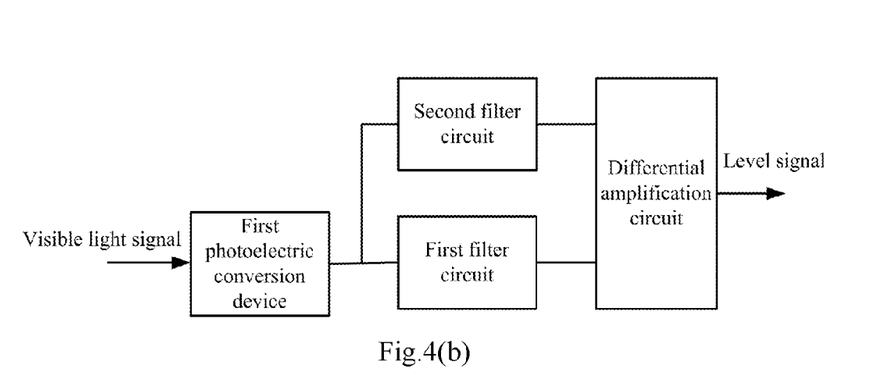
FIG. 4(b) illustrates a second possible schematic structural diagram of the light signal reception circuit including one branch of photoelectric conversion device according to the invention.

Furthermore FIG. 4(b) illustrates a second possible schematic connection diagram of the light signal reception circuit including one branch of photoelectric conversion device, where the light signal reception circuit includes a first photoelectric conversion device, the first and second filter circuit, and the differential amplification circuit, where an output terminal of the first photoelectric conversion device can be connected with the input terminal of the second filter circuit, and the output terminal of the second filter circuit can be connected with one of the input terminals of the differential amplification circuit; and also the output terminal of the first photoelectric conversion device can be further connected with the input terminal of the first filter circuit, and the output terminal of the first filter circuit can be connected with the other input terminal of the differential amplification circuit.

Stated otherwise, at this time, one branch of the first voltage amplitude signal output by the photoelectric conversion device is processed by the second filter circuit and then input to one of the input terminals of the differential amplification circuit, and the other branch of the first voltage amplitude signal is processed by the first filter circuit and then input to the other input terminal of the differential amplification circuit.

Figure 4C:
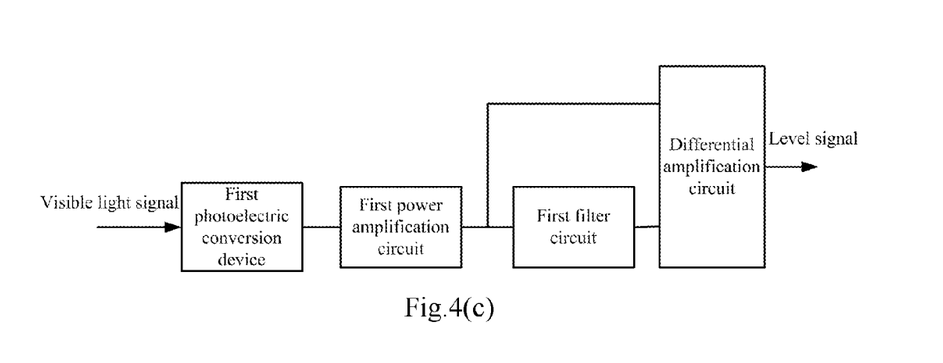
FIG. 4(c) illustrates a third possible schematic structural diagram of the light signal reception circuit including one branch of photoelectric conversion device according to the invention.

FIG. 4(c) illustrates a third possible schematic structural diagram of the light signal reception circuit including one branch of photoelectric conversion device, where the light signal reception circuit includes a first photoelectric conversion device, a first power amplification circuit, the first filter circuit, and the differential amplification circuit, where an output terminal of the first photoelectric conversion device is connected with an input terminal of the first power amplification circuit, an output terminal of the first power amplification circuit is connected with one of the input terminals of the differential amplification circuit, and also possibly with the input terminal of the first filter circuit, and the output terminal of the first filter circuit is connected with the other input terminal of the differential amplification circuit.

Stated otherwise, at this time, the first voltage amplitude signal output by the photoelectric conversion device is firstly power-amplified by the power amplification circuit; and one branch of the first voltage amplitude signal amplified is input directly to one of the input terminals of the differential amplification circuit, and the other branch of the first voltage amplitude signal amplified is processed by the first filter circuit and then input to the other input terminal of the differential amplification circuit.

Figure 4D:
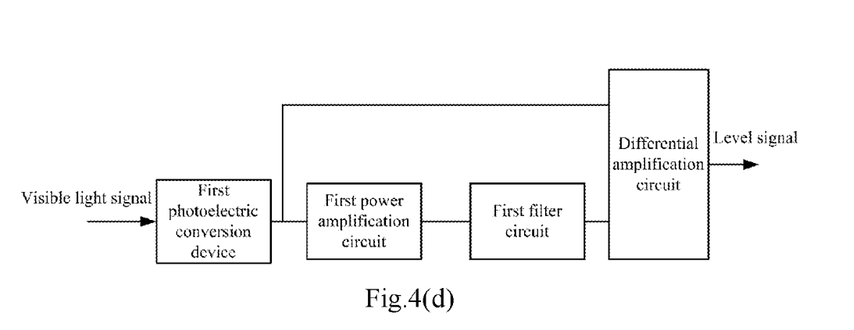
FIG. 4(d) illustrates a fourth possible schematic schematic diagram of the light signal reception circuit including one branch of photoelectric conversion device according to the invention.

Moreover if the light signal reception circuit includes the first photoelectric conversion device, the first power amplification circuit, the first filter circuit, and the differential amplification circuit, then FIG. 4(d) further illustrates a fourth possible schematic connection diagram thereof, where the output terminal of the first photoelectric conversion device can be connected directly with one of the input terminals of the differential amplification circuit, and also with the input terminal of the first power amplification circuit, the output terminal of the first power amplification circuit is connected with the input terminal of the first filter circuit, and the output terminal of the first filter circuit is connected with the other input terminal of the differential amplification circuit.

Stated otherwise, at this time, one branch of the first voltage amplitude signal output by the photoelectric conversion device can be input directly to one of the input terminals of the differential amplification circuit, and the other branch of the first voltage amplitude signal can be firstly power-amplified by the power amplification circuit, processed by the first filter circuit, and then input to the other input terminal of the differential amplification circuit.

Figure 4E:
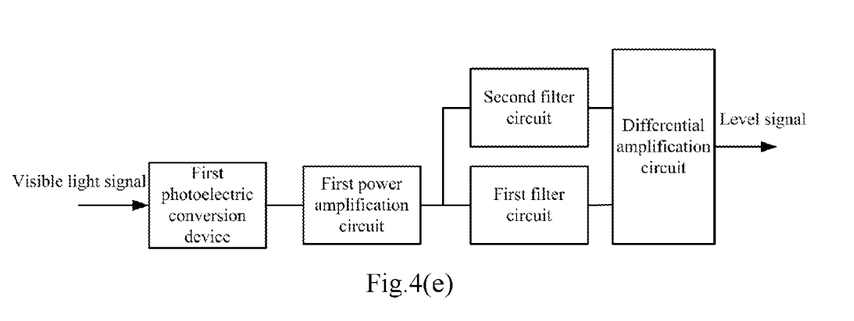
FIG. 4(e) illustrates a fifth possible schematic structural diagram of the light signal reception circuit including one branch of photoelectric conversion device according to the invention.

Furthermore FIG. 4(e) illustrates a fifth possible schematic structural diagram of the light signal reception circuit including one branch of photoelectric conversion device, where the light signal reception circuit includes a first photoelectric conversion device, a first power amplification circuit, the first and second filter circuits, and the differential amplification circuit, where an output terminal of the first photoelectric conversion device is connected with an input terminal of the first power amplification circuit, an output terminal of the first power amplification circuit can be connected with the input terminal of the second filter circuit, the output terminal of the second filter circuit can be connected with one of the input terminals of the differential amplification circuit, and also with the input terminal of the first filter circuit, and the output terminal of the first filter circuit can be connected with the other input terminal of the differential amplification circuit.

Stated otherwise, at this time, the first voltage amplitude signal output by the photoelectric conversion device is firstly power-amplified by the power amplification circuit; and one branch of the first voltage amplitude signal amplified is processed by the second filter circuit and then input to one of the input terminals of the differential amplification circuit, and the other branch of the first voltage amplitude signal amplified is processed by the first filter circuit and then input to the other input terminal of the differential amplification circuit.

Figure 4F:
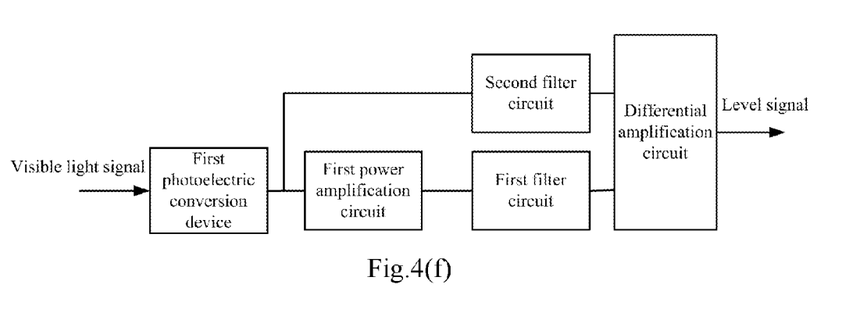
FIG. 4(f) illustrates a sixth possible schematic structural diagram of the light signal reception circuit including one branch of photoelectric conversion device according to the invention.

Moreover if the light signal reception circuit includes the first photoelectric conversion device, the first power amplification circuit, the first and second filter circuit, and the differential amplification circuit, then FIG. 4(f) further illustrates a sixth possible schematic connection diagram thereof, where the output terminal of the first photoelectric conversion device can be connected with the input terminal of the second filter circuit, and the output terminal of the second filter circuit can be connected with one of the input terminals of the differential amplification circuit; and also the output terminal of the first photoelectric conversion device can be connected with the input terminal of the first power amplification circuit, the output terminal of the first power amplification circuit can be connected with the input terminal of the first filter circuit, and the output terminal of the first filter circuit can be connected with the other input terminal of the differential amplification circuit.

Stated otherwise, at this time, one branch of the first voltage amplitude signal output by the photoelectric conversion device can be processed by the second filter circuit and then input to one of the input terminals of the differential amplification circuit, and the other branch of the first voltage amplitude signal can be firstly power-amplified by the power amplification circuit, processed by the first filter circuit, and then input to the other input terminal of the differential amplification circuit.

Figure 4G:
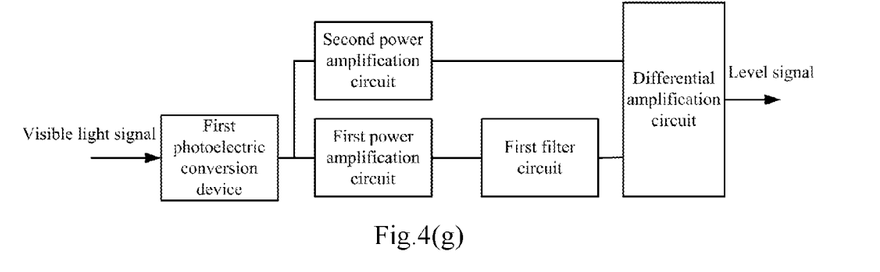
FIG. 4(g) illustrates a seventh possible schematic structural diagram of the light signal reception circuit including one branch of photoelectric conversion device according to the invention.

Furthermore FIG. 4(g) illustrates a seventh possible schematic structural diagram of the light signal reception circuit including one branch of photoelectric conversion device, where the light signal reception circuit includes a first photoelectric conversion device, first and second power amplification circuit, the first filter circuit, and the differential amplification circuit, where an output terminal of the first photoelectric conversion device can be connected with an input terminal of the second power amplification circuit, and an output terminal of the second power amplification circuit can be connected with one of the input terminals of the differential amplification circuit; and also the output terminal of the first photoelectric conversion device can be connected with the input terminal of the first power amplification circuit, an output terminal of the first power amplification circuit can be connected with the input terminal of the first filter circuit, and the output terminal of the first filter circuit can be connected with the other input terminal of the differential amplification circuit.

Stated otherwise, at this time, one branch of the first voltage amplitude signal output by the photoelectric conversion device is firstly power-amplified by the second power amplification circuit, the first voltage amplitude signal amplified is input directly to one of the input terminals of the differential amplification circuit; and the other branch of the first voltage amplitude signal output by the photoelectric conversion device is firstly power-amplified by the first power amplification circuit, processed by the first filter circuit and then input to the other input terminal of the differential amplification circuit.

Figure 4H:
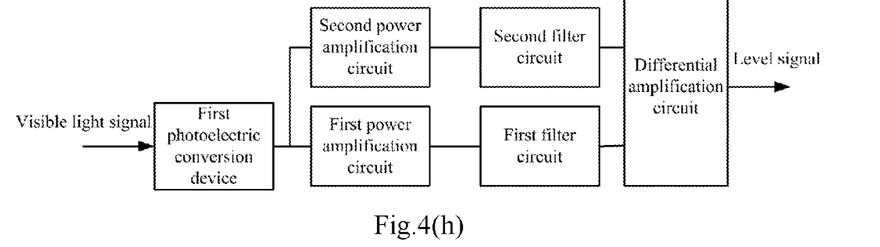
FIG. 4(h) illustrates an eighth possible schematic structural connection diagram of the light signal reception circuit including one branch of photoelectric conversion device according to the invention.

Furthermore FIG. 4(h) illustrates an eighth possible schematic structural diagram of the light signal reception circuit including one branch of photoelectric conversion device, where the light signal reception circuit includes a first photoelectric conversion device, first and second power amplification circuit, the first and second filter circuits, and the differential amplification circuit, where an output terminal of the first photoelectric conversion device can be connected with an input terminal of the second power amplification circuit, an output terminal of the second power amplification circuit can be connected with the input terminal of the second filter circuit, and the output terminal of the second filter circuit can be connected with one of the input terminals of the differential amplification circuit; and also the output terminal of the first photoelectric conversion device can be connected with the input terminal of the first power amplification circuit, an output terminal of the first power amplification circuit can be connected with the input terminal of the first filter circuit, and the output terminal of the first filter circuit can be connected with the other input terminal of the differential amplification circuit.

Stated otherwise, at this time, one branch of the first voltage amplitude signal output by the photoelectric conversion device is firstly power-amplified by the second power amplification circuit, processed by the second filter circuit and then input to one of the input terminals of the differential amplification circuit; and the other branch of the first voltage amplitude signal output by the photoelectric conversion device is firstly power-amplified by the first power amplification circuit, processed by the first filter circuit and then input to the other input terminal of the differential amplification circuit.

Figure 5:
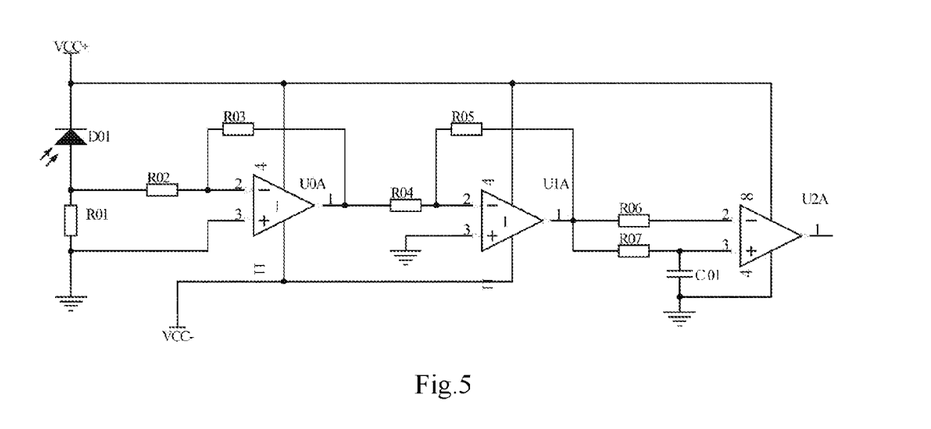
FIG. 5 illustrates a possible schematic connection diagram of the light signal reception circuit including one branch of photoelectric conversion device according to the invention.

Furthermore taking as an example the first photoelectric conversion device being an photosensitive diode, the first filter circuit being an RC filter circuit, the first power amplification circuit being a level-2 proportional amplifying circuit consisted of a comparator and a resistor, and the differential amplification circuit being a comparator, FIG. 5 illustrates a possible schematic connection diagram of the light signal reception circuit illustrated in FIG. 4(c), where:

A cathode of a photoelectric conversion device D01 is connected with a power source VCC, and an anode thereof is connected with the ground through a resistor R01. Voltage across the resistor R01 is power-amplified by a proportional amplification circuit consisted of an operational amplifier U0A, a resistor R02, and a resistor R03, and a proportional amplification circuit consisted of an operational amplifier U1A, a resistor R4, and a resistor R5, and inversed twice so that the direction of the voltage (i.e., the direction of the output voltage of U1A) is adjusted the same as the direction of the voltage across R01; and a voltage value of U1 is input to a negative input terminal of a differential amplification circuit U2A through a resistor R06, and passes a low-pass filter circuit consisted of a resistor R7 and a capacitor C01, and the filtered voltage value is input to a positive input terminal of the differential amplification circuit U2A, where if the selected resistances of R06 and R07 are appropriate, then the output value of the power-amplified voltage of U1A will not be significantly affected by the resistor R06, and the low-pass filter circuit consisted of the resistor R7 and the capacitor C01, so that one branch of photoelectric conversion device can achieve substantially the same effect of signal conversion by two branches of photoelectric conversion devices.

It shall be noted that in the visible light communication system according to the embodiment of the invention, taking as an example the circuit configured to perform the first filter process, which is a low-pass filter circuit, since the second voltage amplitude signal obtained as a result of the low-pass filter process can vary with the varying ambient light, that is, if the ambient light is bright, then the second voltage amplitude signal will rise, and if the ambient light is dark, then the second voltage amplitude signal will drop, as long as the frequency of the ambient light vary from being bright to being dark or from being dark to being bright below the cutoff frequency of the corresponding low-pass filter circuit, the differential amplification circuit can enable the level to be inverted correctly to thereby convert the visible light signal correctly into the level signal, so that the visible light communication system according to the embodiment of the invention can operate normally under both the ambient light in a large range, and the flickering ambient light below the cutoff frequency of the low-pass filter circuit without any interference from noisy signals of the flickering light below the cutoff frequency of the low-pass filter circuit so as to significantly improve the adaptability of the visible light communication system to the brightness of the operating environment, and the robustness thereof to interference including the noise of flickering light, and to lower the bit error rate of visible light communication, thus improving the quality of communication in visible light communication.

Moreover in the technical solution according to the embodiment of the invention, before converting the visible light signal into the level signal according to the voltage difference between the second voltage amplitude signal and the first voltage amplitude signal, the second filter process can be further performed on the first voltage amplitude signal to obtain the third voltage amplitude signal in which the amplitude of the voltage signal above and/or below the frequency of the visible light signal, so that the visible light signal can be converted into the level signal according to the voltage difference between the second voltage amplitude signal, and the third voltage amplitude signal obtained as a result of the second filter process, thus achieving the effect of greatly suppressing the interference of the noisy light different in frequency from visible light communication so as to further improve the quality of communication in visible light communication.

Second Embodiment

Figure 6:
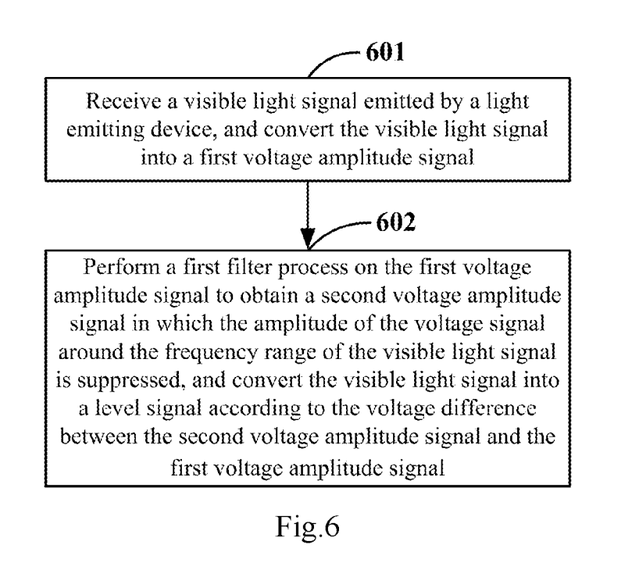
FIG. 6 illustrates a schematic flow chart of a visible light communication method according to the invention.

Based upon the same inventive idea, a second embodiment of the invention provides a visible light communication method, and FIG. 6 illustrates a schematic flow chart of the visible light communication method according to the second embodiment of the invention, where the visible light communication method can include the following operations:

The operation 601 is to receive a visible light signal emitted by a light emitting device, and to convert the visible light signal into a first voltage amplitude signal, where as can be apparent from the related description in the first embodiment, the visible light signal can be created by a signal transmitter converting source signal data into a binary code stream, and controlling the light emitting device to be lightened or blacked out, according to the binary code stream.

The operation 602 is to perform a first filter process on the first voltage amplitude signal to obtain a second voltage amplitude signal in which the amplitude of the voltage signal around the frequency range of the visible light signal is suppressed, and to convert the visible light signal into a level signal according to the voltage difference between the second voltage amplitude signal and the first voltage amplitude signal.

Optionally converting the visible light signal into the first voltage amplitude signal can include:

Converting the visible light signal into the first voltage amplitude signal through one or two branches of photoelectric conversion devices, wherein if there are two branches of photoelectric conversion devices, then the distance between the two branches of photoelectric conversion devices will be not more than a preset distance threshold.

Furthermore if there is one branch of photoelectric conversion device, then the method can further include:

Amplifying power of the first voltage amplitude signal through one or two branches of power amplification circuits before performing the first filter process on the first voltage amplitude signal.

Furthermore performing the first filter process on the first voltage amplitude signal to obtain the second voltage amplitude signal in which the amplitude of the voltage signal around the frequency range of the visible light signal is suppressed, and converting the visible light signal into the level signal according to the voltage difference between the second voltage amplitude signal and the first voltage amplitude signal can include:

Performing the first filter process on the first voltage amplitude signal through a first filter circuit configured to suppress the amplitude of the voltage signal around the frequency range of the visible light signal, to obtain the second voltage amplitude signal in which the amplitude of the voltage signal around the frequency range of the visible light signal is suppressed, and converting the visible light signal into the level signal through a differential amplification circuit according to the voltage difference between the second voltage amplitude signal and the first voltage amplitude signal.

Furthermore before converting the visible light signal into the level signal according to the voltage difference between the second voltage amplitude signal and the first voltage amplitude signal, the method can further include:

Performing a second filter process on the first voltage amplitude signal to obtain a third voltage amplitude signal in which the amplitude of the voltage signal above and/or below the frequency of the visible light signal is suppressed, to convert the visible light signal into the level signal according to the voltage difference between the second voltage amplitude signal and the third voltage amplitude signal obtained as a result of the second filter process.

Moreover it shall be noted that reference can be made to the relevant description in the first embodiment for particular implementations of the respective steps above, so a repeated description thereof will be omitted here.

Third Embodiment

Figure 7:
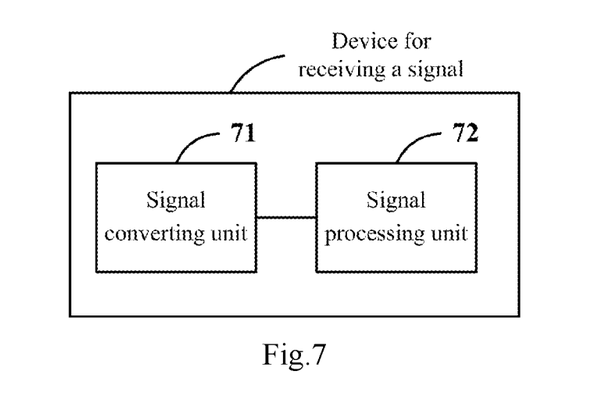
FIG. 7 illustrates a possible schematic structural diagram of a device for receiving a signal according to the invention.

Based upon the same inventive idea, a third embodiment of the invention provides a device for receiving a signal (i.e., the signal receiver), and reference can be made to the relevant description in the first and second embodiments for a particular implementation of the device for receiving a signal, so a repeated description thereof will be omitted here. FIG. 7 illustrates a schematic structural diagram of the device for receiving a signal according to the third embodiment of the invention, where the device for receiving a signal can include:

A signal converting unit 71 can be configured to receive a visible light signal emitted by a light emitting device, and to convert the visible light signal into a first voltage amplitude signal, where the visible light signal can be created by a signal transmitter converting source signal data into a binary code stream, and controlling the light emitting device to be lightened or blacked out, according to the binary code stream; and A signal processing unit 72 can be configured to perform a first filter process on the first voltage amplitude signal to obtain a second voltage amplitude signal in which the amplitude of the voltage signal around the frequency range of the visible light signal is suppressed, and to convert the visible light signal into a level signal according to the voltage difference between the second voltage amplitude signal and the first voltage amplitude signal.

Optionally the signal converting unit 71 can be particularly configured to convert the visible light signal into the first voltage amplitude signal through one or two branches of photoelectric conversion devices, where if there are two branches of photoelectric conversion devices in the signal processing unit, then the distance between the two branches of photoelectric conversion devices will be not more than a preset distance threshold.

Furthermore if there is one branch of photoelectric conversion device in the signal processing unit 72, then the signal processing unit 72 can be further configured to amplify power of the first voltage amplitude signal through one or two branches of power amplification circuits before performing the first filter process on the first voltage amplitude signal.

Furthermore the signal processing unit 72 can be particularly configured to perform the first filter process on the first voltage amplitude signal through a first filter circuit configured to suppress the amplitude of the voltage signal around the frequency range of the visible light signal, to obtain the second voltage amplitude signal in which the amplitude of the voltage signal around the frequency range of the visible light signal is suppressed, and to convert the visible light signal into the level signal through a differential amplification circuit according to the voltage difference between the second voltage amplitude signal and the first voltage amplitude signal.

Furthermore the signal processing unit 72 can be further configured to perform a second filter process on the first voltage amplitude signal according to the voltage difference between the second voltage amplitude signal and the first voltage amplitude signal to obtain a third voltage amplitude signal in which the amplitude of the voltage signal above and/or below the frequency of the visible light signal is suppressed, to convert the visible light signal into the level signal according to the voltage difference between the second voltage amplitude signal and the third voltage amplitude signal obtained as a result of the second filter process.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A visible light communication system, comprising a light emitting device, a signal transmitter, and a signal receiver, wherein:
   the signal transmitter is configured to convert source signal data into a binary code stream, and to control the light emitting device to be lightened or blacked out according to the binary code stream to create a visible light signal; and
   the signal receiver is configured to convert the visible light signal into a first voltage amplitude signal, to perform a first filter process of suppressing amplitude of the voltage signal around the frequency range of the visible light signal on the first voltage amplitude signal to obtain a second voltage amplitude signal in which the amplitude of the voltage signal around the frequency range of the visible light signal is suppressed, and to convert the visible light signal into a level signal according to the voltage difference between the second voltage amplitude signal and the first voltage amplitude signal.

2. The visible light communication system according to claim 1, wherein:
   the signal receiver is configured to convert the visible light signal into the first voltage amplitude signal through one or two branches of photoelectric conversion devices, wherein if there are two branches of photoelectric conversion devices in the signal receiver, then the distance between the two branches of photoelectric conversion devices will be not more than a preset distance threshold.

3. The visible light communication system according to claim 2, wherein:
   if there is one branch of photoelectric conversion device in the signal receiver, then the signal receiver is further configured to amplify power of the first voltage amplitude signal through one or two branches of power amplification circuits before performing the first filter process on the first voltage amplitude signal.

4. The visible light communication system according to claim 1, wherein:
   the signal receiver is configured to perform the first filter process on the first voltage amplitude signal through a first filter circuit configured to suppress the amplitude of the voltage signal around the frequency range of the visible light signal, to obtain the second voltage amplitude signal in which the amplitude of the voltage signal around the frequency range of the visible light signal is suppressed, and to convert the visible light signal into the level signal through a differential amplification circuit according to the voltage difference between the second voltage amplitude signal and the first voltage amplitude signal.

5. The visible light communication system according to claim 4, wherein the first filter circuit comprises at least:
   a low-pass filter circuit with a cutoff frequency below the frequency of the visible light signal, or a band-stop filter circuit capable of attenuating frequency components around the frequency range of the visible light signal to a preset threshold.

6. The visible light communication system according to claim 1, wherein
   before converting the visible light signal into the level signal according to the voltage difference between the second voltage amplitude signal and the first voltage amplitude signal, the signal receiver is further configured to perform a second filter process on the first voltage amplitude signal to obtain a third voltage amplitude signal in which the amplitude of the voltage signal above and/or below the frequency of the visible light signal is suppressed, to convert the visible light signal into the level signal according to the voltage difference between the second voltage amplitude signal and the third voltage amplitude signal obtained as a result of the second filter process.

7. A visible light communication method, comprising:
   receiving a visible light signal emitted by a light emitting device, and converting the visible light signal into a first voltage amplitude signal; and
   performing a first filter process of suppressing amplitude of the voltage signal around the frequency range of the visible light signal on the first voltage amplitude signal to obtain a second voltage amplitude signal in which the amplitude of the voltage signal around the frequency range of the visible light signal is suppressed, and converting the visible light signal into a level signal according to the voltage difference between the second voltage amplitude signal and the first voltage amplitude signal.

8. The visible light communication method according to claim 7, wherein converting the visible light signal into the first voltage amplitude signal comprises:
converting the visible light signal into the first voltage amplitude signal through one or two branches of photoelectric conversion devices, wherein if there are two branches of photoelectric conversion devices, then the distance between the two branches of photoelectric conversion devices will be not more than a preset distance threshold.

9. The visible light communication method according to claim 8, wherein if there is one branch of photoelectric conversion device, then the method further comprises:
amplifying power of the first voltage amplitude signal through one or two branches of power amplification circuits before performing the first filter process on the first voltage amplitude signal.

10. The visible light communication method according to claim 7, wherein performing the first filter process on the first voltage amplitude signal to obtain the second voltage amplitude signal in which the amplitude of the voltage signal around the frequency range of the visible light signal is suppressed, and converting the visible light signal into the level signal according to the voltage difference between the second voltage amplitude signal and the first voltage amplitude signal comprises:
performing the first filter process on the first voltage amplitude signal through a first filter circuit configured to suppress the amplitude of the voltage signal around the frequency range of the visible light signal, to obtain the second voltage amplitude signal in which the amplitude of the voltage signal around the frequency range of the visible light signal is suppressed, and converting the visible light signal into the level signal through a differential amplification circuit according to the voltage difference between the second voltage amplitude signal and the first voltage amplitude signal.

11. The visible light communication method according to claim 7, wherein before converting the visible light signal into the level signal according to the voltage difference between the second voltage amplitude signal and the first voltage amplitude signal, the method further comprises:
performing a second filter process on the first voltage amplitude signal to obtain a third voltage amplitude signal in which the amplitude of the voltage signal above and/or below the frequency of the visible light signal is suppressed, to convert the visible light signal into the level signal according to the voltage difference between the second voltage amplitude signal and the third voltage amplitude signal obtained as a result of the second filter process.

12. A device for receiving a signal, the device comprising:
a signal receiver configured to receive a visible light signal emitted by a light emitting device, and to convert the visible light signal into a first voltage amplitude signal; and
a processor configured to perform a first filter process of suppressing amplitude of the voltage signal around the frequency range of the visible light signal on the first voltage amplitude signal to obtain a second voltage amplitude signal in which the amplitude of the voltage signal around the frequency range of the visible light signal is suppressed, and to convert the visible light signal into a level signal according to the voltage difference between the second voltage amplitude signal and the first voltage amplitude signal.

13. The device for receiving a signal according to claim 12, wherein:
the signal receiver is configured to convert the visible light signal into the first voltage amplitude signal through one or two branches of photoelectric conversion devices, wherein if there are two branches of photoelectric conversion devices in the signal processing unit, then the distance between the two branches of photoelectric conversion devices will be not more than a preset distance threshold.

14. The device for receiving a signal according to claim 13, wherein:
if there is one branch of photoelectric conversion device in the processor, then the processor is further configured to amplify power of the first voltage amplitude signal through one or two branches of power amplification circuits before performing the first filter process on the first voltage amplitude signal.

15. The device for receiving a signal according to claim 12, wherein:
the processor is configured to perform the first filter process on the first voltage amplitude signal through a first filter circuit configured to suppress the amplitude of the voltage signal around the frequency range of the visible light signal, to obtain the second voltage amplitude signal in which the amplitude of the voltage signal around the frequency range of the visible light signal is suppressed, and to convert the visible light signal into the level signal through a differential amplification circuit according to the voltage difference between the second voltage amplitude signal and the first voltage amplitude signal.

16. The device for receiving a signal according to claim 12, wherein:
the processor is further configured to perform a second filter process on the first voltage amplitude signal according to the voltage difference between the second voltage amplitude signal and the first voltage amplitude signal to obtain a third voltage amplitude signal in which the amplitude of the voltage signal above and/or below the frequency of the visible light signal is suppressed, to convert the visible light signal into the level signal according to the voltage difference between the second voltage amplitude signal and the third voltage amplitude signal obtained as a result of the second filter process.

* * * * *